United States Patent
Dibbern et al.

(10) Patent No.: US 10,534,588 B2
(45) Date of Patent: Jan. 14, 2020

(54) DATA PROCESSING SIMULATOR WITH SIMULATOR MODULE AND DATA ELEMENTS

(71) Applicant: SAP SE, Walldorf (DE)

(72) Inventors: Raphael Dibbern, Oftersheim (DE); Olaf Tennie, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/003,435

(22) Filed: Jun. 8, 2018

(65) Prior Publication Data

US 2019/0377557 A1    Dec. 12, 2019

(51) Int. Cl.
*G06F 9/44*          (2018.01)
*G06F 8/38*          (2018.01)
*G06F 8/10*          (2018.01)
*G06F 8/20*          (2018.01)

(52) U.S. Cl.
CPC .................. *G06F 8/38* (2013.01); *G06F 8/10* (2013.01); *G06F 8/20* (2013.01)

(58) Field of Classification Search
CPC .................................. G06F 8/38; G06F 9/455
USPC .................. 717/105–111, 124–127, 134–135
See application file for complete search history.

(56) References Cited

U.S. PATENT DOCUMENTS

| | | | | |
|---|---|---|---|---|
| 5,838,948 A * | 11/1998 | Bunza | .................... | G06F 11/261 703/27 |
| 6,650,731 B1 * | 11/2003 | Steltner | .................. | H04M 3/362 379/15.01 |
| 7,213,034 B2 * | 5/2007 | Dorsett, Jr. | ........... | G06F 16/289 717/108 |
| 7,376,945 B1 * | 5/2008 | Kakumani | ............ | G06F 9/4416 717/171 |
| 7,797,708 B2 * | 9/2010 | Weber | ..................... | G06F 16/21 719/313 |
| 7,970,596 B2 * | 6/2011 | Bade | ................... | G06F 17/5022 703/13 |
| 8,086,995 B2 * | 12/2011 | Luo | .......................... | G06F 8/38 717/105 |
| 8,261,234 B1 * | 9/2012 | Aarts | ....................... | G06F 8/45 703/7 |

(Continued)

OTHER PUBLICATIONS

Mukkamala et al, "Designing Reusable Simulation Modules for Electronics Manufacturing Systems ", ACM, pp. 1281-1289 (Year: 2003).*

(Continued)

*Primary Examiner* — Anil Khatri
(74) *Attorney, Agent, or Firm* — Buckley, Maschoff & Talwalkar LLC

(57) ABSTRACT

A method and system including an application server; a framework including a simulator module; a display; a storage device; and a simulator processor in communication with the simulator module and operative to execute processor-executable process steps to cause the system to: receive a metadata file for an application; receive a request from a user interface associated with the application; transmit the request to the simulator module; generate, in response to the received request, one or more simulated data elements at the simulator module based on the metadata and a communication protocol; and display the one or more simulated data elements on the display. Numerous other aspects are provided.

16 Claims, 5 Drawing Sheets

(56) References Cited

U.S. PATENT DOCUMENTS

| | | | | |
|---|---|---|---|---|
| 8,527,943 | B1* | 9/2013 | Chiluvuri | G06F 8/36 717/106 |
| 8,600,712 | B1* | 12/2013 | Harvey | F42B 4/00 345/632 |
| 8,627,296 | B1* | 1/2014 | Picard | G06F 11/3684 717/124 |
| 8,694,968 | B2* | 4/2014 | Eteminan | G06F 8/20 717/103 |
| 8,719,776 | B2* | 5/2014 | Eteminan | G06F 8/34 717/106 |
| 8,761,575 | B2* | 6/2014 | Zbeda | A63F 13/85 386/248 |
| 8,887,130 | B2* | 11/2014 | Seetharaman | G06F 8/10 717/108 |
| 8,966,453 | B1* | 2/2015 | Zamfir | G06F 11/3604 714/38.1 |
| 9,104,867 | B1* | 8/2015 | Thioux | G06F 21/56 |
| 9,405,863 | B1* | 8/2016 | Helikar | G16B 5/00 |
| 9,583,020 | B1* | 2/2017 | Kronfeld | G09B 19/00 |
| 9,665,385 | B1* | 5/2017 | Nguyen | G06F 9/455 |
| 9,952,837 | B1* | 4/2018 | Maclay | G06F 8/35 |

OTHER PUBLICATIONS

Enns et al, "A Simulation Test Bed for Production and Supply Chain Modeling", ACM, pp. 1174-1182 (Year: 2003).*

Covington et al, "The Efficient Simulation of Parallel Computer Systems", International Journal in Computer Simulation, pp. 31-58 (Year: 1991).*

Gaonza et al, "Design and Implementation of a Scalable Constraint-based Routing Module for QoS Path Computation", ACM, pp. 103-112 (Year: 2007).*

Cole et al, "Joint Data Base Elements for Modeling and Simulation", ACM, pp. 971-976 (Year: 1993).*

Moalla et al, "A Design Tool for the Multilevel Description and Simulation of Systems of Interconnected Modules", ACM, pp. 20-27 (Year: 1976).*

Chen et al, "The Design and Implementation of WiMAX Module for ns-2 Simulator", ACM, pp. 1-9 (Year: 2006).*

* cited by examiner

DATA PROCESSING SIMULATOR WITH SIMULATOR MODULE AND DATA ELEMENTS

BACKGROUND

Development of an application may be a complex task. The number and complexity of requests the application may be able to answer may depend on the specification of a communication protocol used by the application to communicate with a request client and a backend (e.g., data access layer) of a system, and the complexity of the metadata, i.e., the number and size of the objects the application exposes to respond to the request. While the application developer may know and understand all of the applications objects, the application developer may not know all of the operations the application may support based on the protocol. Further, even if the application developer knows all of these operations, actual implementation of all of the needed operations may still be complex.

Systems and methods are desired which provide more efficient application development.

DETAILED DESCRIPTION

Figure 1:
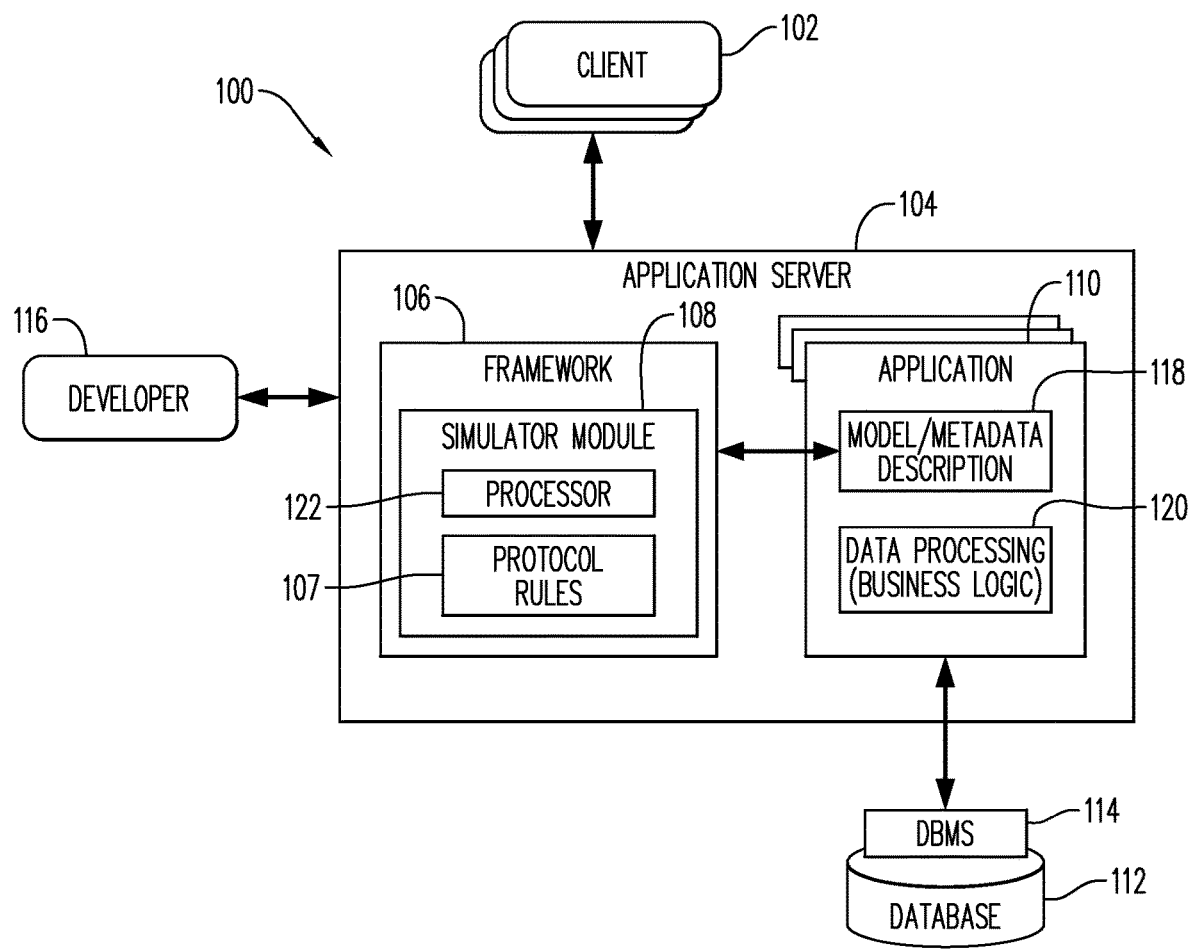
FIG. 1 is a block diagram of a system architecture according to some embodiments.

The following description is provided to enable any person in the art to make and use the described embodiments, and sets forth the best mode contemplated for carrying out some embodiments. Various modifications, however, will remain readily apparent to those in the art.

One or more embodiments or elements thereof can be implemented in the form of a computer program product including a non-transitory computer readable storage medium with computer usable program code for performing the method steps indicated herein. Furthermore, one or more embodiments or elements thereof can be implemented in the form of a system (or apparatus) including a memory, and at least one processor that is coupled to the memory and operative to perform exemplary method steps. Yet further, in another aspect, one or more embodiments or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

The development of an application may include the development of two major building blocks, the user interface (UI) application block and data processing implementation block (e.g. business logic and rules) that the UI application block consumes. Conventionally, the development of the UI application block may depend on a working underlying data processing implementation, including business logic and rules of the application for responding to the requests generated via the UI. For example, during development of the UI, a common UI pattern is made of two screens. On the first screen, the user sees a list of items which need to be retrieved from the data processing implementation. Then the user selects one of these items, which triggers an additional request to the data processing implementation, and then opens a new screen with the details of this item. As such, the conventional development of the UI may be delayed based on the data processing implementation. For example, the data processing implementation may take a relatively long time, and/or the data processing implementation may be delayed as it may be part of a larger and as-yet incomplete project.

Another problem with conventional application management may be that, during testing of the application, and even live (non-testing and non-development) execution thereof, if the data processing implementation block seemingly returns wrong data, it may be difficult to identify the reason for the "wrong" data. For example, the "wrong" data may be the result of an error in the data processing implementation, an error in a software framework, a misunderstanding by the tester/client/application consumer of how the application should behave, or for any other suitable reason.

It is noted that these problems may intensify in hosted environments (e.g., cloud-based environments) where the development and/or support of an application may have limited possibilities and tool support, due to security and privacy aspects, for example. As an extreme case, in the cloud-based environment, the application support may not be allowed to use a debugger or similar tools for a certain problem in order to protect the hosted data.

As used herein, the term "software framework" may refer to a reusable software environment or platform that provides a particular functionality as part of a larger software platform to facilitate development of software applications, products and solutions. The software framework may include predefined classes and functions that may be used to process input, manage hardware devices, and interact with system software. The framework includes an application programming interface (API) and may include code libraries, a compiler, and other programs used in the software development process.

Embodiments provide for a framework, including a simulator module, to address the challenges described above. In one or more embodiments, the framework may replace the data processing implementation block (e.g., business logic and rules) with the simulator module, which may simulate the effect of real implementation of the business logic and rules without any business logic or rules. The simulator module may provide data elements that may allow the user interface (UI) developer to proceed with the development of the UI without waiting for the data processing implementation to exist or be complete.

In one or more embodiments, the framework may allow for the exposure of data elements as adhering to a well-defined communication protocol (e.g., OData). As used herein, "communication protocol" may refer to a set of rules in which computers communicate with each other. For example, the communication protocol may indicate which part of the conversation comes at which time, and how to end the communication, among other rules. More particularly, the communication protocol may provide the framework by which applications may expose the application's metadata and business logic. An example of a well-defined communication protocol is OData (Open Data Protocol). OData is an OASIS standard that defines the best practice for building and consuming "RESTful" APIs, which communicate data/requests between the software components. In OData, the requests may be identified using URLs and defined in a data model, using simple HTTP messages. OData may define the request and response headers, status codes, HTTP methods, URL conventions, media types, payload formats, and query options, etc. The OData metadata, a machine-readable description of the data model of the APIs, enables the creation of e.g., generic clients and tools. While OData may be described herein as the communication protocol, any suitable well-defined communication protocol may be used.

In one or more embodiments, the simulator module may generate simulated responses to queries to aid: the UI developer in creating the UI, a tester when testing a developed UI, or in the resolution of a client problem with returned data during live execution of the application.

In one or more embodiments, the application may include two parts: 1. a model/metadata, which is a formal description of the formatted way that objects (e.g., use cases, class diagrams, other Unified Modeling Language (UML) models, requirement and design documents, etc.) are exposed during execution of the application (e.g., a "Material" field has ten characters); and 2. a data processing implementation (e.g., business logic). One or more embodiments may also include, as part of the metadata, protocol rules for reading every object defined in the metadata. For example, every object defined in the metadata may be read with a certain URL, or other suitable protocol. It is noted that, in one or more embodiments, the framework may offer at least two sets of APIs. The first to be implemented by the application, and the second to be consumed by clients. The client-facing APIs may be URL endpoints, or may be, for example, offered on the same platform and in the same programming language as the APIs to be implemented by an application. As such, when reading the metadata, the manner in which to frame a request for execution by the application is provided. Further, to actually implement the application from the client perspective, the application may include business logic (i.e., rules). For example, the business logic may include rules that a particular material (e.g., Material 7) needs to exist before responding to a query about the material, or that a user or data element is not living in a certain area, or meets certain authorization requirements to reach certain objects.

The simulator module may generate the simulated responses based solely on the metadata and protocol rules ("protocol") for reading/writing/updating the objects defined in the metadata, without the business logic. As the protocol is known, the possible request types (e.g., READ or UPDATE request of a single object) are known. The protocol and description of the application metadata may allow the simulator module to respond to the request received from the UI. For example, for a READ request of an object, the simulator module may return that object, setting each of its fields with a value matching that field's data type length, name, etc. As a non-exhaustive example:

READ of object "Team 1" returns
"Team Name"="Team 1"
"Member Count"=1

It is noted that the simulator module may not function like the application associated with the metadata because the application may not yet be fully developed with logic rules and/or tested and ready to be used by clients. As such, for example, when the request from the UI is "Read Material 7," the simulator module may return "Material 7," which is in the format specified by the metadata and protocol, independent of whether Material 7 exists or there is authorization to receive Material 7 per any business rules, etc.

A benefit of one or more embodiments may be that the development between the UI and the business logic may be easier because there may be no waiting for one to be complete before the other is started (e.g., the de-coupling of the UI development from the backend business logic development). As such, the UI may be developed without the backend business logic being complete or developed at all.

Another benefit of one or more embodiments may be that for executed applications in a live or test environment that encounter problems, the generated simulated data may show how a correctly implemented application may behave, which may help to identify a problem with an executing application. For example, if the data provider was working properly, this is the information that may be returned. As a non-exhaustive example, the request that resulted in the problem in the live/test environment may be executed with the simulator module. The simulated response does not match the application's real data, but it matches the protocol definition and the metadata. As such, the new simulated response may be compared against the real response from the test/live environment and an expected response. This comparison may allow for the identification of where the actual error occurs. If, for example, the simulated response is "correct" per the expected response, then the application may have an error.

One or more embodiments may be used during development and testing of an application. During development and testing, the application may be expected to return a particular data element when a URL or HTTP request is received, as there is a well-defined communication protocol in place, that may dictate the request be answered in a particular way. During testing, it may become evident that there are one or more API calls (e.g., operations the application can invoke at runtime to perform a task) the UI developer was unaware of during development of the UI. For example, certain protocols (e.g., OData) allow the construction of complex requests. As a non-exhaustive example, a client may not only request a list of items, but also may request a list of items together with, for example, somehow related items (e.g., a list of customers with the last three products each customer has purchased.) The application may have implemented the retrieval of both item lists (e.g., implemented a Read of customers (Customer 1, Customer 2 . . . ), a Read of products purchased by a customer (Product 1, Product 2)) but has not yet implemented the retrieval of the nested list which includes both item types (Read of customers together with their last three purchases (for Customer 1: Product A, Product B, Product C; for Customer 2: Product D, Product E and Product F, etc.)). In one or more embodiments, a corresponding request may be answered by the framework, showing, for example, how a corresponding response would look.

FIG. 1 is a block diagram of system architecture 100 according to some embodiments. Embodiments are not limited to architecture 100. Architecture 100 includes a client device 102, an application server 104, a framework 106, a simulator module 108, applications 110, a database 112, a database management system (DBMS) 114, and a developer 116. The client device 102 may comprise one or more devices used by an organization during operation thereof. For example, the client device 102 may be a desktop computer or a laptop. The client device 102 and developer 116 may comprise one or more individuals or devices executing program code of a software application for interacting with application server 104, and by extension, the simulator module 108. Presentation of a user interface as described herein may comprise any degree or type of rendering, depending on the type of user interface code generated by application server 104.

For example, a client 102 or developer 116 may execute a Web Browser to request and receive a Web page (e.g., in HTML format) from a website application 110 of application server 104, via HTTP, HTTPS, and/or Web Socket, and may render and present the Web page according to known protocols. One or more of clients 102/developers 116 may also, or alternatively, present user interfaces by executing a standalone executable file (e.g., an .exe file) or code (e.g., a JAVA® applet) within a virtual machine. A user (e.g., client/developer) may then query objects in the database 112 or the simulator module 108 from the web page or user interface.

As used herein, devices, including those associated with the system 100 and any other devices described herein, may exchange information via any communication network which may be one or more of, a Near Field Communication ("NFC") network; a Web Real-Time Communication (RTC) network; a Bluetooth network, and/or an Internet Protocol ("IP") network such as the Internet, an intranet, or an extranet. Note that any devices described herein may communicate via one or more such communication networks.

Applications 110 may comprise server-side executable program code (e.g., compiled code, scrips, etc.) executing within application server 104 to receive requests from clients 102 and provide results to clients 102 or other systems/applications (not shown) based on data of database 112. The applications 110 may include models/metadata 118, and data processing or business logic 120.

The framework 106 may be an environment or platform that provides a particular functionality as part of a larger software platform to facilitate development of software applications, products and solutions. The framework 106 may include predefined classes and functions that may be used to process input, manage hardware devices, and interact with system software. The framework 106 may include the simulator module 108.

The simulator module 108 may include a processor 122. The processor 122 may, for example, be a conventional microprocessor, and may operate to control the overall functioning of the simulator module 108. In one or more embodiments, the framework 106 redirects the requests to the processor 122 from the developer 116 or client 102 and the processor 122 generates a simulated response to the request, as described further below. The simulator module 108 may also include the protocol rules 107 to provide a structure for the requests.

Application server 104 provides any suitable interfaces through which clients 102 and the developer 116 may communicate with the framework 106 (and simulator module 108) and applications 110 executing on the application server 104. For example, application server 104 may include a HyperText Transfer Protocol (HTTP) interface supporting a transient request/response protocol over Transmission Control Protocol/Internet Protocol (TCP/IP), a Web Socket interface supporting non-transient full-duplex communications which implement the Web Socket protocol over a single TCP/IP connection, and/or an Open Data Protocol (OData) interface.

One or more applications 110 executing on application server 104 may communicate with the DBMS 114 using database management interfaces such as, but not limited to, Open Database Connectivity (ODBC) and JAVA® Database Connectivity (JDBC) interfaces. Some of these types of applications may use Structured Query Language (SQL) to manage and query data stored in database 112.

DBMS 114 serves requests to retrieve and/or modify data of database 112, and also performs administrative and management functions. Such functions may include snapshot and backup management, indexing, optimization, garbage collection, and/or any other database functions that are or become known. DBMS 114 may also provide application logic, such as database procedures and/or calculations, according to some embodiments. This application logic may comprise scripts, functional libraries and/or compiled program code.

Application server 104 may be separated from, or closely integrated with, DBMS 114. A closely-integrated application server 104 may enable execution of server applications 110 completely on the database platform, without the need for an additional application server. For example, according to some embodiments, application server 104 provides a comprehensive set of embedded services which provide end-to-end support for Web-based applications. The services may include a lightweight web server, configurable support for OData, server-side JAVASCRIPT® execution and access to SQL and SQLScript.

Application server 104 may provide application services (e.g., via functional libraries) which applications 110 may use to manage and query the data of database 112. The application services can be used to expose the database data model, with its tables, hierarchies, views and database procedures, to clients. In addition to exposing the data model, application server 104 may host system services such as a search service.

Database 112 may store data used by at least one of the applications 110, and the simulator module 108. For example, database 112 may store data elements that may be used by the simulator module 108 to populate a UI, as further described below with respect to the metadata annotations.

Database 112 may comprise any query-responsive data source or sources that are or become known, including but not limited to a structured-query language (SQL) relational database management system. Database 112 may comprise a relational database, a multi-dimensional database, an eXtendable Markup Language (XML) document, or any other data storage system storing structured and/or unstructured data. The data of database 112 may be distributed among several relational databases, dimensional databases, and/or other data sources. Embodiments are not limited to any number or types of data sources.

In some embodiments, the data of database 112 may comprise one or more of conventional tabular data, row-based data, column-based data, and object-based data. Moreover, the data may be indexed and/or selectively replicated in an index to allow fast searching and retrieval thereof. Database 112 may support multi-tenancy to separately support multiple unrelated clients by providing multiple logical database systems which are programmatically isolated from one another.

Database 112 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

FIGS. 2-5 include a flow diagram of a process 200 (FIG. 2), a table 300 (FIG. 3), and non-exhaustive examples of the process 200 (FIGS. 4, 5) according to some embodiments. Process 200 may be executed by framework 106 according to some embodiments, e.g., by execution of the simulator module 108 to display one or more simulated data elements. In one or more embodiments, the application server 104 (and framework and simulator module) may be conditioned to perform the process 200, such that a processor 610 (FIG. 6) of the server 104 is a special purpose element configured to perform operations not performable by a general-purpose computer or device.

All processes mentioned herein may be executed by various hardware elements and/or embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Any user interface used herein by the client 102 or developer 116 may be presented on any type of display apparatus (e.g., desktop monitor, smartphone display, tablet display) provided by any type of device (e.g., desktop system, smartphone, tablet computer).

Initially at S210, a metadata file 300 (FIG. 3) is received by the application server 104. The metadata file 300 may be created by at least one of a system administrator, a UI developer, a backend application logic developer ("backend developer") and another system. The metadata file 300 may define a structure for the data values of the objects that are exposed by the UI-initiated execution of the application. As a non-exhaustive example, the metadata file creators may be developing a sales application, which may be able to create, update, and delete sales orders/items. These creators may not yet know how these functions will work, but they may know that for the sales orders, a UI 402 (FIG. 4) may include several data entry fields 404 (e.g., a unique identification field, a description of the item, a currency field, an amount field, an aggregated sum field, etc.) with links to the metadata. It is noted that the information entered into a UI is effectively sending a request to the application server 104, and may be sending the request in a particular well-defined and structured format per the protocol. It is noted that after the metadata is defined, the incomplete application (e.g., incomplete because missing the business logic rules) may be consumed in the simulated mode, as described further below, before the development of the data processing implementation (e.g., business logic rules) has even started.

Figures 2, 3:
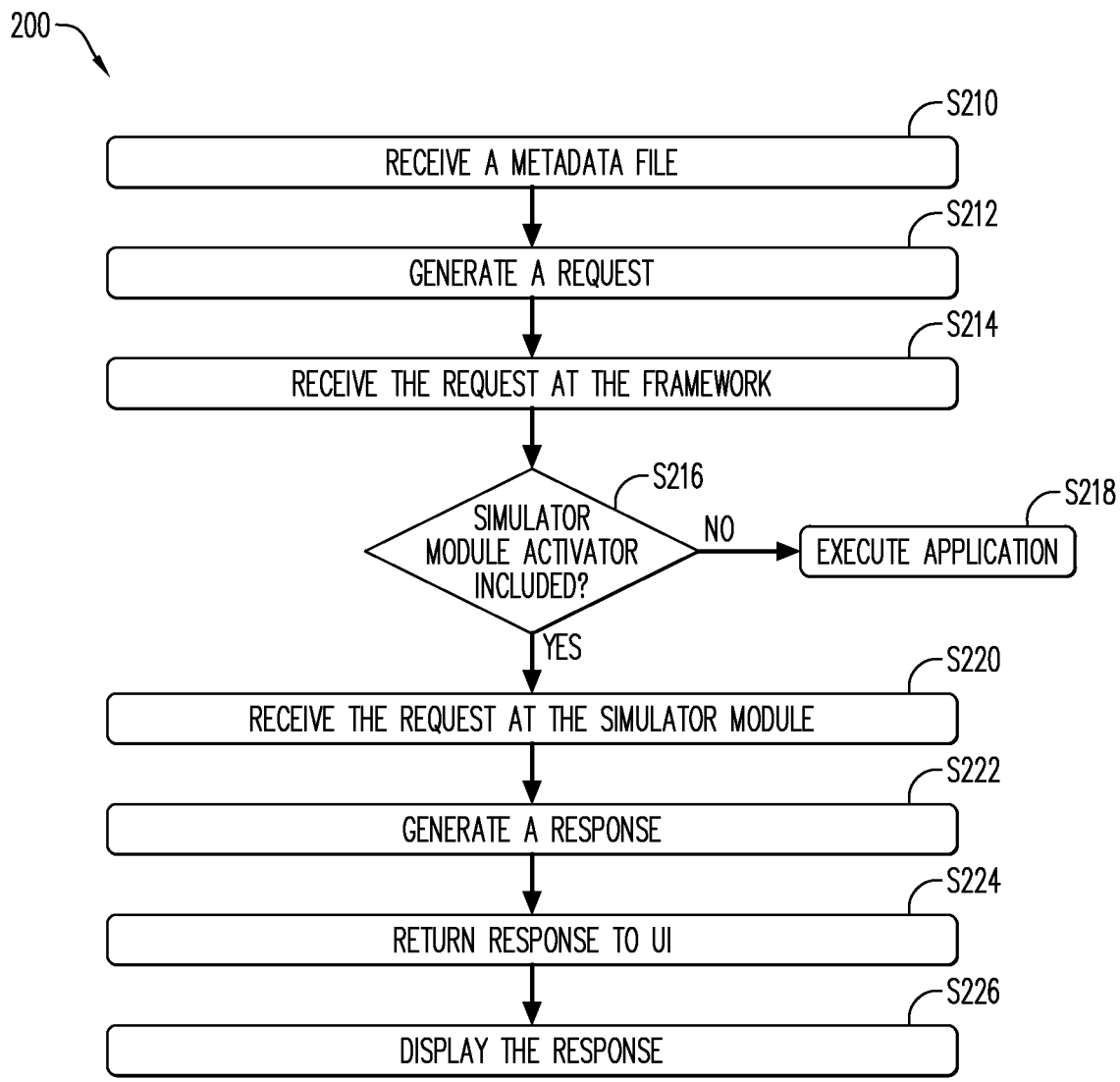
FIG. 2 is a flow diagram of a process according to some embodiments.
FIG. 3 is non-exhaustive example of a metadata table according to some embodiments.

As shown in FIG. 3, in one or more embodiments, the structure may include the data entry field name 302, a data type for that field 304, and an associated format for the data type 306. The data type for the field 304 may, in one or more embodiments, adhere to an entity data model (EDM). EDM refers to a set of concepts that describe data structure, regardless of its stored form. Data types supported by EDM include string, Boolean, and Int32, among others. Other suitable data types for the field 304 may be used, including but not limited to a Date (e.g., a delivery date), Time of day (e.g., opening hour of a store), Decimal (e.g., the price of a product) and Characters with a length restriction (e.g., three characters for the ISO Code of a currency). Other suitable structural elements may be included in the metadata file 300. For example, the metadata file 300 may indicate that for a data entry field name of "UniqueIdentifier," the datatype may be at least one of alpha, numeric and special characters, and the format may allow for 10 characters, or for a data entry field name of "Date," the datatype may alpha and/or numeric (e.g., delivery date). In one or more embodiments, the UI 402 may be populated with values based on these structural elements stored in the metadata file, as well as the protocol rules 107, as described further below. The metadata file 300 may be stored as part of the application 110, and accessed by the simulator module 108, as described below. It is noted that a description of the metadata may be included as part of the application. The metadata description may be used for both of the UI application and the simulator module. The metadata description may be provided as a file, via coding (by implementing an additional set of APIs) or via a configuration done in a design time tool (offered together with the framework), for example, which then may, as a non-exhaustive example, store this configuration in an additional database table also owned by the framework. Both the framework and the simulator module may access the metadata during runtime. In embodiments, the client application may also access the metadata via, e.g., an additional URL endpoint, or other suitable process.

Then at S212, a request or query is generated by the UI. The UI may be associated with the application 110 because the UI is being, or has been, developed to access and/or execute the application.

Figure 4:
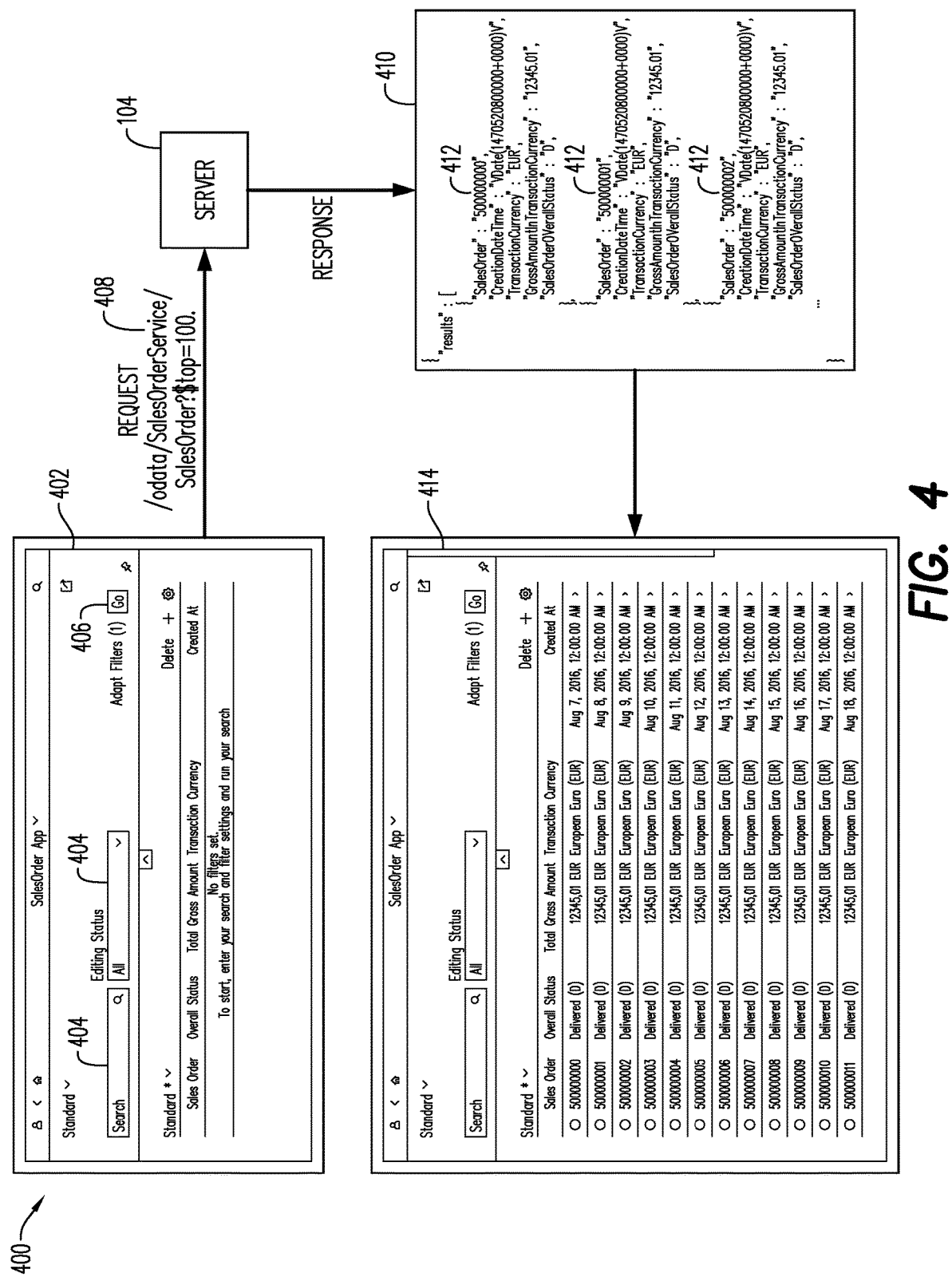
FIG. 4 is a non-exhaustive example of the process in FIG. 2 according to some embodiments.

In one or more embodiments, at least a portion of the UI has been developed by the UI developer 116 prior to S212. The UI developer 116 then accesses the UI via a browser or any other suitable integrated development environment, and the UI is displayed on a display 400 (FIG. 4).

In one or more embodiments, the developer 116 may request the application perform some function (e.g., a request for data) via the user interface. As a non-exhaustive example, FIG. 4 provides a user interface 402 associated with a sales order application 110. As used herein, the terms "developer" and "user" may be used interchangeably. The UI 402 may include one or more data entry fields 404 (e.g., a search field and an editing status field). The data entry fields 404 may receive free-form text or selection of an item (e.g., via radio button, a drop-down menu, or any other suitable selection method). In one or more embodiments, when the data entry field 404 receives free-form text, the field may be populated with suggestions based on the data entered in the field 404. For example, typing in a field with additional annotation information (e.g., currency field) may suggest as auto-completion 'EURO" while entering 'EU"

Continuing with the example shown herein, the user 116 may request "ALL" as the editing status for "Sales Order" by selecting the "Go" selection control 406. Any other suitable selection control 406 may be used. Then the UI 402 generates a request 408 for the application server 104. In one or more embodiments, the UI 402 may generate the request 408 per one or more rules of the communication protocol 107. In one or more embodiments, the determination of which communication protocol to be used may be made during the creation of the application 110. In one or more embodiments, the request 408 may be: /odata/SalesOrderService/SalesOrder?$top=100.

For a request using OData, the request 408 may be sent to the application server 104 via HTTP, AtomPub, and JSON using URLs to address and access data resources, in embodiments. The use of the OData protocol 107 may enable information to be accessed from a variety of sources including, but not limited to, relational databases, file systems, content management systems, and traditional websites.

In one or more embodiments, when the developer 116 wants to use the simulator module 108, they may include a simulator module activator 409 in the request. For example, if the application 110 is provided to the user via http, the simulator module activator 409 may be included by offering an alternative endpoint, or via a URL parameter, or via an http header field. In the request described above, the simulator module activator 409 may be triggered, and instead of processing the request through the framework 106, the simulator module 108 processes the request. Therefore, the metadata description 118 and the request 408 may be evaluated. It is noted that depending on the request, a proper response 410 may be generated in the processor 122 and responded.

Turning back to the process 200, the generated request 408 is received by the framework 106 at the application server 104 in S214. The framework 106 may then determine whether the request 408 includes the simulator module activator 409 in S216. In one or more embodiments, the determination may be based on additional URL information or on framework specific customizing. An additional URL information could be either a parameter, a different segment or an additional HTTP header. Any other suitable determination process may be used.

When it is determined in S216 that the request 408 does not include the simulator module activator 409, the request 408 may be sent directly to the application 110 for execution thereof in S218 via the application's data processing implementation block.

When it is determined in S216 that the request does include the simulator module activator 409, the request 408 may be transmitted to the simulator module 108 in S220, as the framework 106 replaces the application's data processing implementation block with the simulator module 108.

The simulator module 108 then generates, in response to the received request 408, a response 410 in S222. The response 410 may include one or more simulated data elements 412. In one or more embodiments, the response 410 may be based on metadata and protocol rules. As described above, the metadata may include a data type 304, and then based on this data type, and associated format 306, the response may be generated. In one or more embodiments, as a non-exhaustive example, the response 410 may be name of the field, if this meets the appropriate data type and associated format per the metadata. If there is more than one of the same field being populated with a response, the response may be the field name and a number (e.g., SalesOrder1, SalesOrder2, SalesOrder3). It is noted that as the context is typically unknown, since the application is not complete, the response 410 may be any suitable characters that meet the requirements of the data type 304 and associated format 306.

It is noted that when OData is used, OData may include metadata of the metadata referred to as "annotations," which may be used to further define the fields. For example, the annotation may indicate to the UI that this response for the material field is part of an address, and not just a string with length 10. The annotation may indicate to the simulator module 108 that the simulated data element 412 may include additional information that may be provided in the metadata description 118. For example, if the annotation is indicative of a currency, there is a link to a data source (e.g., database 112), including all available currencies.

In one or more embodiments, the simulator module 108 may operate on persisted data, e.g., database tables that may be generated on the fly based on the application's metadata. The simulator module 108 may start with no data, may have a person enter the initial data into the data storage, or may generate some data into the storage. In one or more embodiments, the simulator module 108 may operate on data kept in memory for a certain while. The simulator module 108 may generate the data needed to answer a request on the fly (e.g., as the request is being answered), depending on the application's metadata, for example, and every time. It is noted that the application 110 and the model description 118 may be pulled from a storage. Further, depending on the implementation of the simulator module 108, there may be some base data available for answering some sort of request or some base lines of code.

Continuing with the example shown in FIG. 4, for the request for all sales orders, the simulator module 108 may generate a response 410 that may include simulated sales order data elements 412. While three simulated sales order data elements are shown herein, any suitable number of simulated data elements may be provided to answer the request according to the OData protocol properly. For the example herein, the metadata file 300 indicated the data type field 304 for the SalesOrder field is an integer and the associated format is nine characters, and three sales orders are generated, each with an increasing sales order number (500000000, 500000001, 500000002). As another example, if the client 102 requests a certain amount of entries, this specific amount may be provided as a response. Should the certain amount information not be provided, the simulator module 108 may reply with default logic.

Then in S224, the simulator module 108 returns the response 410 to the UI 402. The response 410 may be returned via http or any other suitable medium. The UI 402 may then render the response for display in S226 via any suitable rendering process. The UI developer 116 may then determine if the rendered response 414 is as expected (e.g., was a name or number returned? Was it the correct number of digits? etc.).

In one or more embodiments, in addition to determining whether the structure of the rendered response 414 is as expected, the UI developer 116 may also determine whether manipulation of the response results in an expected response. For example, if the UI developer 116 clicks on a data element 412, will the UI navigate to the appropriate information.

Figure 5:
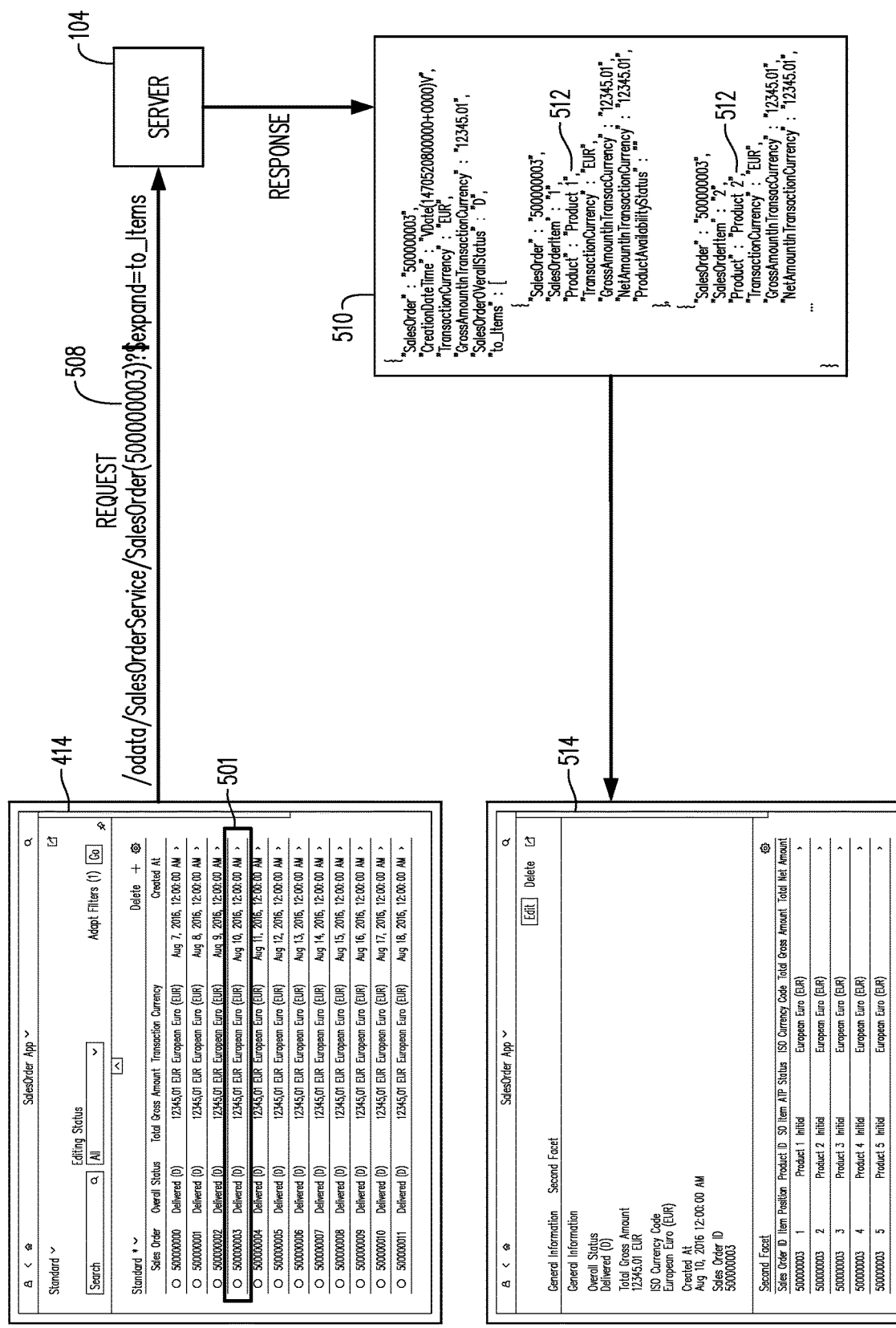
FIG. 5 is a non-exhaustive example of the process in FIG. 2 according to some embodiments.

Turning to FIG. 5, which continues the example shown in FIG. 4, the first rendered response 414 is provided. The UI developer 116 requests a specific "Sales Order," by clicking on the line entry, as indicated by the box 501 in FIG. 5. The process 200 is then repeated from S212, and a request 508 is generated. In this instance, the request 508 may be:
/odata/SalesOrderService/SalesOrder(500000003)?$expand=to_Items The request 508 may be received by the framework 106 at the application server 104, via http for example, in S214. The framework 106 determines the request 508 includes the simulator module activator 509 in S216. In this non-exhaustive example, the simulator module activator is set in the framework specific customized for in the request 508 given to application service 110. The simulator module 108 receives the request in S220, and generates the response 510 in S222. As shown in FIG. 5, the response 510 includes simulated product data elements 512 (e.g., Product 1, Product 2, etc.) for the particular SalesOrder. The response 510 is then returned to the UI in S224, and the UI renders the response 514 in S226.

Figure 6:
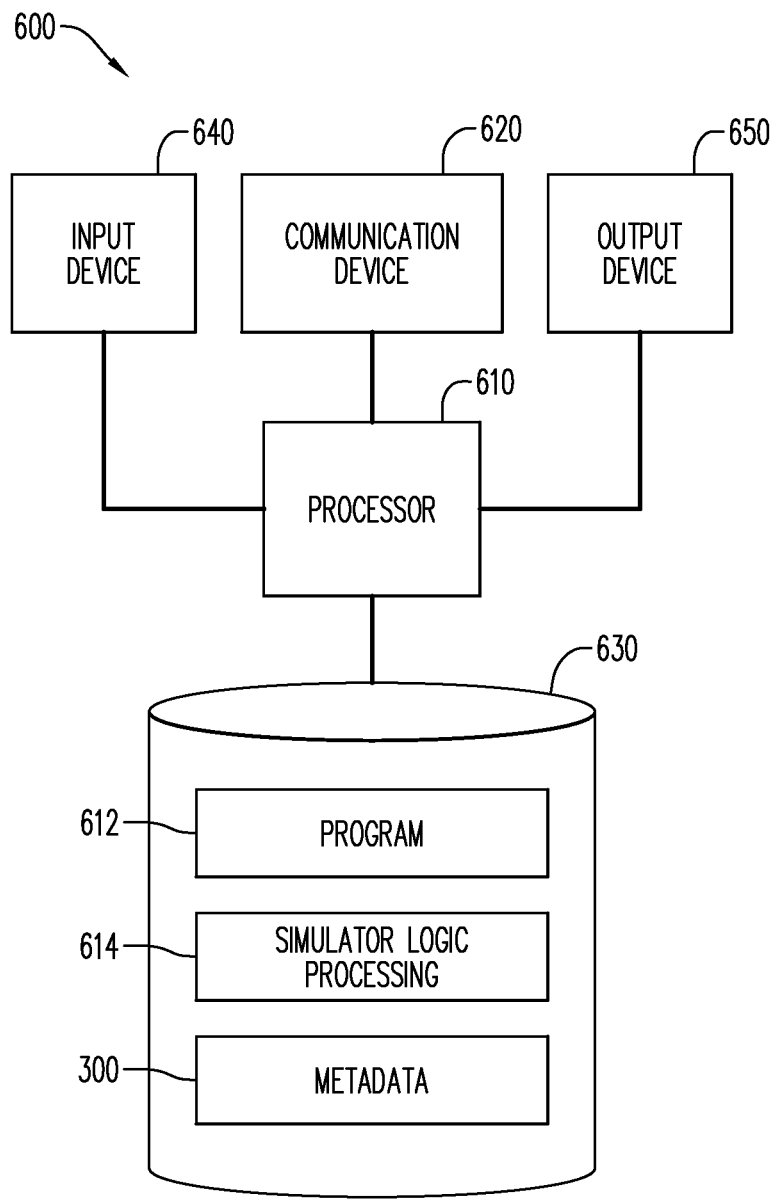
FIG. 6 is a block diagram of a system according to some embodiments.

FIG. 6 is a block diagram of apparatus 600 according to some embodiments. Apparatus 600 may comprise a general- or special-purpose computing apparatus and may execute program code to perform any of the functions described herein. Apparatus 600 may comprise an implementation of one or more elements of system 100. Apparatus 600 may include other unshown elements according to some embodiments.

Apparatus 600 includes simulator processor 610 operatively coupled to communication device 620, data storage device 630, one or more input devices 640, one or more output devices 650 and memory 660. Communication device 620 may facilitate communication with external devices, such as application server 104. Input device(s) 640 may comprise, for example, a keyboard, a keypad, a mouse or other pointing device, a microphone, knob or a switch, an infra-red (IR) port, a docking station, and/or a touch screen. Input device(s) 640 may be used, for example, to manipulate graphical user interfaces and to input information into apparatus 600. Output device(s) 650 may comprise, for example, a display (e.g., a display screen) a speaker, and/or a printer.

Data storage device/memory 630 may comprise any device, including combinations of magnetic storage devices (e.g., magnetic tape, hard disk drives and flash memory), optical storage devices, Read Only Memory (ROM) devices, Random Access Memory (RAM) etc.

The storage device 630 stores a program 612 and/or simulator platform logic 614 for controlling the processor 610. The processor 610 performs instructions of the programs 612, 614, and thereby operates in accordance with any of the embodiments described herein, including but not limited to process 200.

The programs 612, 614 may be stored in a compressed, uncompiled and/or encrypted format. The programs 612, 614 may furthermore include other program elements, such as an operating system, a database management system, and/or device drivers used by the processor 610 to interface with peripheral devices.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of computing devices in communication with one another via any number of other public and/or private networks. Two or more of such computing devices of may be located remote from one another and may communicate with one another via any known manner of network(s) and/or a dedicated connection. Each computing device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more computer-readable non-transitory media. Such non-transitory media may include, for example, a fixed disk, a floppy disk, a CD-ROM, a DVD-ROM, a Flash drive, magnetic tape, and solid-state RAM or ROM storage units. Embodiments are therefore not limited to any specific combination of hardware and software.

The embodiments described herein are solely for the purpose of illustration. Those in the art will recognize other embodiments may be practiced with modifications and alterations limited only by the claims.

What is claimed is:

1. A system comprising: an application server;
a framework including a simulator module; a display;
a storage device; and
a simulator processor in communication with the simulator module and operative to execute processor-executable process steps to cause the system to: receive a metadata file for an application;
receive a request from a user interface associated with the application for execution of the application, wherein execution of the application is expected to return a particular data element in response to the request:
transmit the request to the simulator module;
generate, in response to the received request for execution of the application, and without using business logic of the application for execution,
one or more simulated data elements that correspond the particular data elements, at the simulator module based on the metadata and a communication protocol; and
display the one or more simulated data elements on the display;
wherein the metadata file includes a data type that describes a structure for the simulated data elements generated by the simulator module.

2. The system of claim 1, wherein each of the simulated one or more data elements meets requirements for the data type in the metadata file.

3. The system of claim 1, wherein the generated one or more simulated data elements each include a field name included in the request and a number, and wherein each simulated data element is unique.

4. The system of claim 1, further comprising:
an additional data source, and wherein the simulator module uses data from the additional data source to generate each of the one or more simulated data elements.

5. The system of claim 1, wherein the request adheres to a well-defined communication protocol format.

6. The system of claim 1, wherein the request includes a simulator module activator.

7. The system of claim 6, wherein transmitting the request to the simulator module further comprises processor-executable process steps to cause the system to:
determine the request includes the simulator module activator.

8. The system of claim 1, wherein the metadata file describes a structure for the simulated data elements generated by the simulator module.

9. A computer-implemented method comprising:
receiving a metadata file for an application at an application server; receiving a request from a user interface associated with the application at a framework for execution of the application,
wherein execution of the application is expected to return a particular data element in response to the request:
transmitting the request to a simulator module;
generating, via the simulator module, and in response to the received request for execution of the application, and without using business logic of the application for execution, one or more simulated data elements that correspond to the particular data elements, at the simulator module based on the metadata and a communication protocol; and displaying the one or more simulated data elements on the display;

wherein the metadata file includes a data type that describes a structure for the simulated data elements generated by the simulator module.

10. The method of claim 9, wherein the request adheres to a well-defined communication protocol format.

11. The method of claim 9, wherein the request includes a simulator module activator.

12. The method of claim 11, wherein transmitting the request to the simulator module further comprises:

determining the request includes the simulator module activator.

13. The method of claim 9, wherein the metadata file describes a structure for the simulated data elements generated by the simulator module.

14. The method of claim 9, wherein each of the simulated one or more data elements meets requirements for the data type in the metadata file.

15. A non-transitory computer-readable medium storing program code, the program code executable by a computer system to cause the computer system to:

receive a metadata file for an application;

receive a request from a user interface associated with the application for execution of the application, wherein execution of the application is expected to return a particular data element in response to the request;

transmit the request to the simulator module;

generate, in response to the received request for execution of the application, and without using business logic of the application for execution, one or more simulated data elements that correspond to the particular data elements, at the simulator module based on the metadata and a communication protocol; and display the one or more simulated data elements on the display.

16. The medium of claim 15, wherein the request adheres to a well-defined communication protocol format.

* * * * *